(12) United States Patent
Galbreath et al.

(10) Patent No.: US 7,677,660 B2
(45) Date of Patent: Mar. 16, 2010

(54) ACOUSTICALLY TUNED SEATING ASSEMBLY

(75) Inventors: Ashford A. Galbreath, Troy, MI (US); Asad S. Ali, Troy, MI (US); Pusheng Chen, Novi, MI (US); Paul Severinski, Brownstown, MI (US); Mark A. Jay, Ann Arbor, MI (US); Victoria Shkreli Pacilli, Windsor (CA)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/850,878

(22) Filed: Sep. 6, 2007

(65) Prior Publication Data

US 2009/0066127 A1 Mar. 12, 2009

(51) Int. Cl.
*A47C 7/62* (2006.01)
(52) U.S. Cl. ............... 297/217.1; 297/217.4; 297/219.1
(58) Field of Classification Search ............. 297/217.1, 297/217.3, 217.4, 452.62, 218.1–218.5, 219.1, 297/228.1
See application file for complete search history.

(56) References Cited

U.S. PATENT DOCUMENTS

| 4,097,633 | A | * | 6/1978 | Focht | ......................... 428/138 |
| 5,539,182 | A | | 7/1996 | Meurer | |
| 5,669,670 | A | | 9/1997 | Haraguchi et al. | |
| 5,700,052 | A | | 12/1997 | Yamazaki et al. | |
| 5,853,005 | A | * | 12/1998 | Scanlon | ....................... 600/459 |
| 6,003,950 | A | | 12/1999 | Larsson | |
| 6,273,810 | B1 | * | 8/2001 | Rhodes et al. | ............... 454/120 |
| 6,345,688 | B1 | | 2/2002 | Veen et al. | |
| 6,648,100 | B2 | | 11/2003 | Ebbitt | |
| 7,159,938 | B1 | * | 1/2007 | Shiraishi | ................... 297/217.4 |
| 2003/0098598 | A1 | * | 5/2003 | English et al. | ............ 297/219.1 |
| 2004/0112011 | A1 | * | 6/2004 | Sperry et al. | ................... 53/440 |
| 2005/0263345 | A1 | * | 12/2005 | Erickson et al. | ............. 181/290 |
| 2006/0065481 | A1 | * | 3/2006 | Connelly | ..................... 181/290 |

* cited by examiner

*Primary Examiner*—David Dunn
*Assistant Examiner*—Erika Garrett
(74) *Attorney, Agent, or Firm*—Brooks Kushman P.C.

(57) ABSTRACT

The present invention relates to an acoustically tuned vehicle seat assembly comprising a frame, a cushion supported on the frame, and a non-cloth trim material secured over the cushion, the non-cloth trim material having at least one slitted region having a plurality of scored slits.

20 Claims, 4 Drawing Sheets

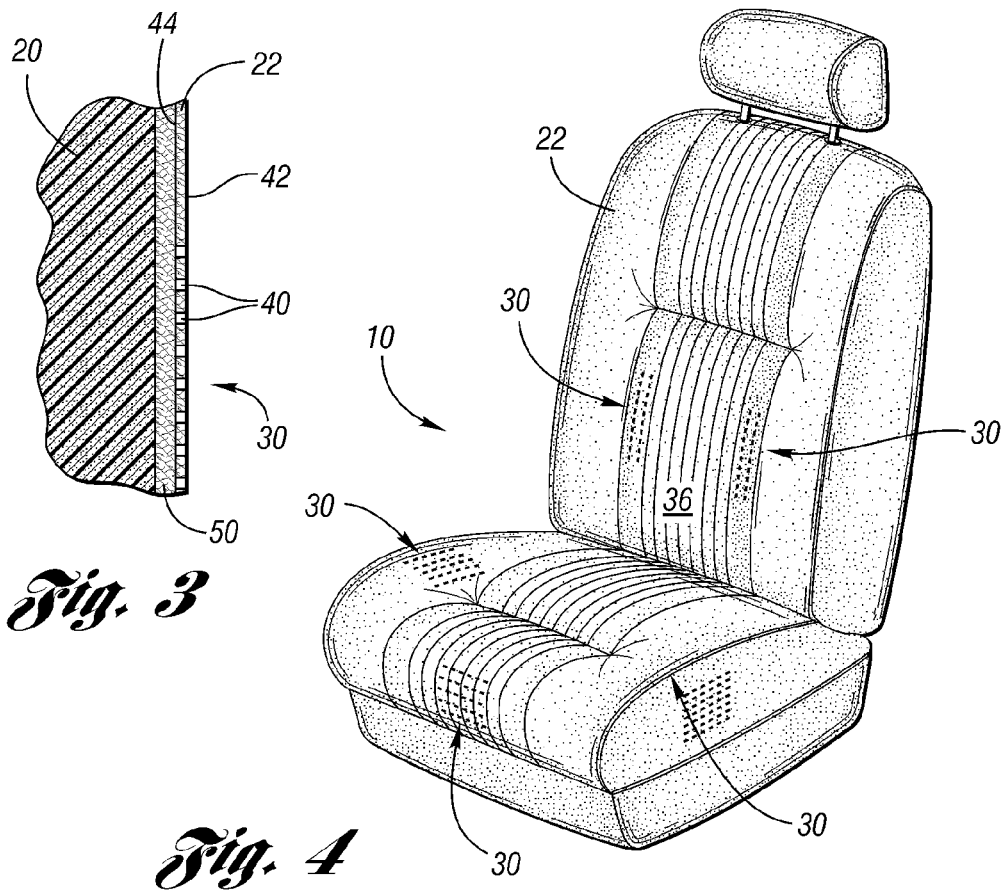
*Fig. 3*
*Fig. 4*
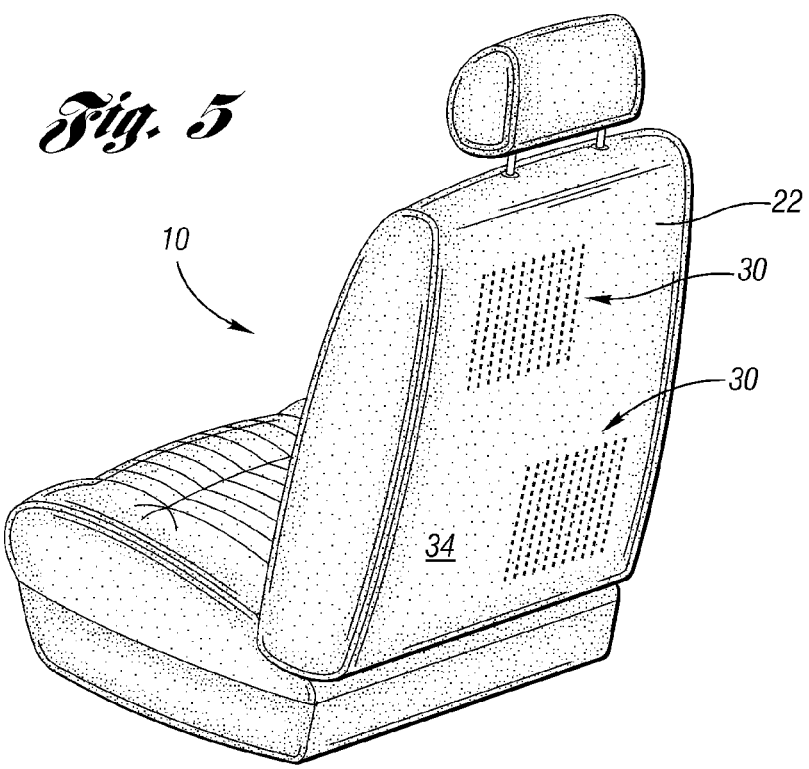
*Fig. 5*

ACOUSTICALLY TUNED SEATING ASSEMBLY

BACKGROUND OF THE INVENTION

1. Field of the Invention

The present invention relates to an acoustically tuned seat assembly and a method of making the same. In at least one embodiment, the present invention relates to an acoustically tuned seat assembly, wherein acoustic absorption, magnitude and peak efficacy, are tuned on an interior specific basis, and a method of making and doing the same.

2. Background Art

Vehicle seat assemblies are known. Generally speaking, most seat assemblies include three fundamental components: (a) a frame to support the seat assembly and mount it to a vehicle body within an occupant compartment; (b) a foam cushion to cover the frame; and (c) trim material to cover the foam cushion and provide a durable surface for contact with a seat assembly occupant.

SUMMARY OF THE INVENTION

According to at least one aspect of the present invention, a vehicle seat assembly is provided. In at least one embodiment, the vehicle seat assembly comprises a frame, a cushion supported on the frame, and a non-cloth trim material secured over the cushion, with the non-cloth trim material having at least one slitted region capable of providing a sound absorption of at least 3.25 sabines at 1,250 Hz according to ASTM C423 with the slitted region comprising a plurality of scored preformed slits having an average width of less than 4.0 mm, an average length of 0.25 to 8 mm, and a percent open area of 0.10 to 30%. In at least one variation, the vehicle seat assembly can comprise a relatively thin permeable foam layer attached to the trim material.

In at least another embodiment, the vehicle seat assembly comprises a frame, a cushion supported on the frame and having a first sound absorption characteristic, a fibrous layer having a second sound absorption characteristic greater than the first sound absorbing characteristic and comprising a non-woven polymeric fibrous pad having a thickness of 2 to 25 mm, a weight of 1 to 16 oz/ft$^2$, and a leather trim material secured over the cushion. In at least this embodiment, the leather trim material comprises at least one slitted region having a plurality of laser scored slits having an average diameter of less than 4.0 mm, an average length of 0.25 to 8 mm, and at least one non-slitted region adjacent the slitted region, with the non-slitted region being substantially free of slits. In at least this embodiment, the slitted region is located in an area of the trim material where noise is likely to be absorbed and the fibrous layer is separate from the trim material and is located between the cushion and the slitted region of the trim material.

According to at least another aspect of the present invention, a method of making a vehicle seat assembly is provided. In at least one embodiment, the method comprises providing a cushion assembly comprising a cushion supported on a frame, and securing a non-cloth trim material over the cushion supported on the frame, with the non-cloth trim material having at least one slitted region having a plurality of scored slits having an average width of less than 4.0 mm, an average length of 0.25 to 8 mm, and a percent open area of 2 to 25%. In at least one variation of this method, a relatively thin permeable foam layer is attached to the trim material. In certain embodiments, a non-woven fibrous pad layer can replace the thin permeable foam layer allowing, in at least one exemplary manner, the frequency of peak absorption to be changeable by an average of 200 Hz, as measured by ASTM E1050-98, to match vehicle interior sound frequency.

BRIEF DESCRIPTION OF THE DRAWINGS

FIG. 3 is a schematic sectional view of the vehicle seat assembly illustrated in FIG. 2, taken through line 3-3;

FIG. 4 is a schematic environmental view of a vehicle seat assembly illustrating yet another embodiment of the present invention;

FIG. 5 is a view similar to FIG. 4 illustrating still yet another embodiment of the present invention;

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

Figure 1:
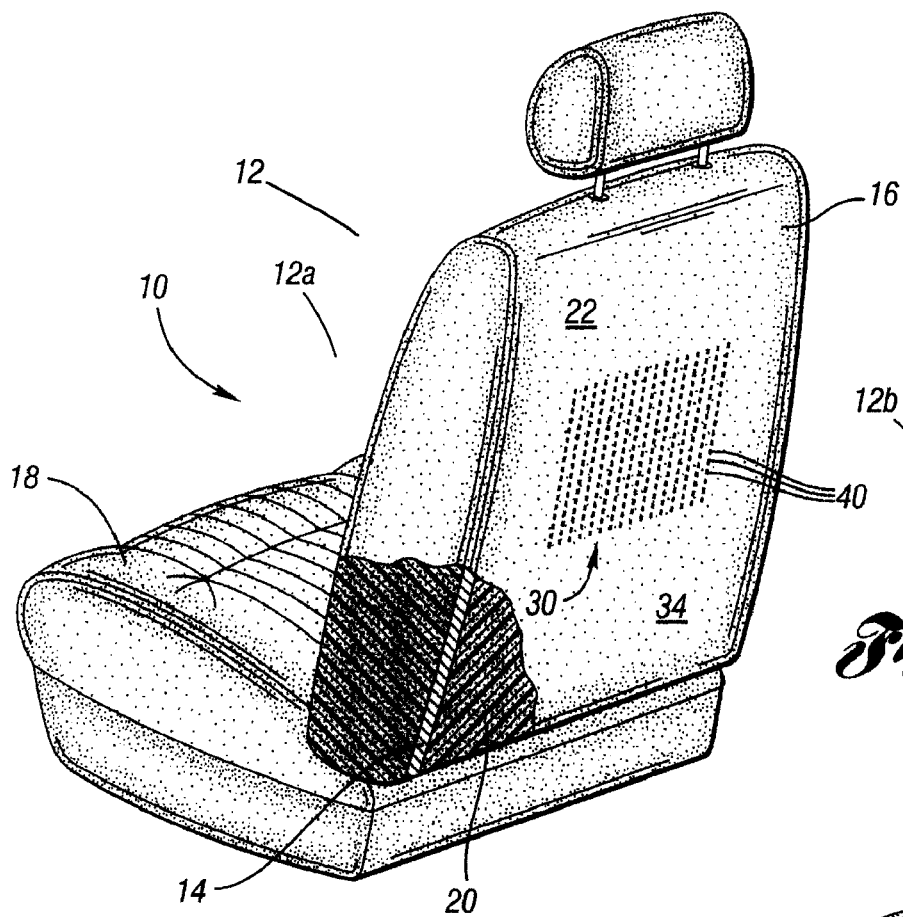
FIG. 1 is a schematic cut-away environmental view of a vehicle seat assembly in accordance with an embodiment of the present invention.

Referring now to the Figures, where like numerals are used to designate like structures throughout the drawings, a schematic vehicle seat assembly in accordance with at least one embodiment of the present invention is generally shown at 10 in FIG. 1. While the vehicle seat assembly 10 is illustrated in FIG. 1 to be a bucket seat assembly, it should be understood that the principles of the invention are applicable to other types of seat assemblies, such as bench, captain and other types of seat assemblies. It should also be understood that the principles of the present invention are applicable to other vehicle interior trim components where foam and/or non-cloth trim are components such as backrests, back support pads, armrests, and head restraints. Still further, it should also be understood that the principles of this invention are applicable to all types of vehicle seat assemblies as well as non-vehicle seat assemblies.

As shown in FIG. 1, the vehicle seat assembly 10 includes a seat frame, generally indicated at 14 having a plurality of mounting brackets (not shown) adapted to operatively secure the seat frame within an occupant compartment 12 of a vehicle. In the illustrated embodiment, the seat assembly 10 is a front seat and the occupant compartment 12 has a front compartment 12a generally in front of the seat assembly 10 and a rear compartment 12b generally in back of the seat assembly 10.

The seat frame 14 may be constructed from any material suitable for application within a vehicle seat assembly 10, such as aluminum, steel or other metal alloy, composite material, or a suitable polymer. Further, the seat frame 14 may be manufactured using techniques commonly known in the art, and relative to the type of material employed. By way of example, manufacturing techniques may include stamping, welding, fastening or molding a suitable material to form the seat frame 14.

The vehicle seat assembly 10 also includes a seat back, generally indicated at 16, and a lower seat assembly, generally indicated at 18. In at least the illustrated embodiment, the seat back 16 and the lower seat assembly 18 each have a cushion 20 supported on the frame 14 and covered by a trim material 22. However, it should be understood that the cushion 20 for the seat back 16 can differ from the cushion 20 of the lower seat assembly 18. Likewise, it should be understood that the trim material 22 for the seat back 16 can differ from the trim material 22 for the lower seat assembly 18.

The cushion 20 can have any suitable size, shape and configuration, however in at least one embodiment, has an average thickness of 0.5 to 4 cm, and in at least another embodiment of 1 to 3 cm. The cushion 20 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574.

In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 KPa, in another embodiments of 20 to 28 KPa, and in yet other embodiments of 23 to 26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems Corporation, and Dow Chemical. Any soy-based polyurethane may be used, however in at least one embodiment, suitable soy-based polyurethanes include, but are not necessarily limited to those available from Renosol.

As discussed above, the vehicle seat assembly 10 also includes a non-cloth trim material 22 which is adapted to engage the cushion 20 in a covering relationship. The trim material 22 may include any non-cloth material such as leather, vinyl, polyurethane film, and TPU trim material, as are known in the art. Additional materials for use as trim material 22, may include a foam backing secured to the underside of the trim material (not shown, but generally known in the art) which may be manufactured from a variety of polymer foam materials. By way of example, the foam backing may be polyethylene, polyester, wood fiber composite with polyester, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity. In at least one particularly preferred embodiment, the trim material 22 comprises leather trim material having polyester or nylon trim fasteners (not shown) for securing the trim material 22 to one or more components (i.e., cushion 20 and/or frame 14) of the vehicle seat assembly 10.

In accordance with at least one embodiment of the present invention, the seat assembly 10 is acoustically tuned to help absorb undesirable noise in the occupant compartment 12. In at least one embodiment, the non-cloth trim material 22 has been provided with a slitted area 30. The slitted area 30 is shown in FIG. 1 to be in the back surface 34 of the trim layer, as this is an advantageous location for sound absorption. As can be seen in FIG. 4, the trim layer 22 also has a front surface 36.

The slitted area 30 comprises a plurality of relatively minuscule slits 40 that have been cut in the trim material 22. As can best be seen in FIG. 3, the slits 40 extend from the exterior surface 42 of the trim material 22 to the interior surface 44 of the trim material. It should be understood that cuts are different from perforations, i.e., puncture holes. Puncture holes are relatively circular holes that are punched into a layer of material by a punching protrusion, such as a pin. The punching of the holes essentially moves the layer material away from the punching protrusion to form the hole. These holes, however, have a tendency to close up since the material can move back after the punching protrusion is removed. Slits are formed by the cutting of a length of the layer material. Cutting the material tends to keep the material from closing up or returning to its pre-cut shape. In at least one embodiment, the slits 40 are formed by a heated cutting. Heated cutting can be suitably accomplished by laser or other means and can further inhibit post-cutting close-up.

The slits 40 have an average width of less than 4.0 mm. In at least one embodiment, the slits 40 have an average width of between 0.05 and 3.0 mm, in another embodiment of 0.1 and 2.15, in yet another embodiment of 0.25 and 2.0, and in still yet another embodiment of between 0.50 and 1.5 mm. In at least one particularly preferred embodiment, the slits 40 have an average width of 0.25 mm. In at least one embodiment, the slits 40 each are all substantially the same size.

While the slits 40 can be provided in the trim material 22 in any suitable location, pattern and configuration, in at least one embodiment, the slits are provided in a manner in which a desired amount of sound absorption is provided. In at least one embodiment, the slits 40 will enable the seat assembly 10 to have a sound absorption of 3.25 to 4.75 sabines at 1,250 Hz, in another embodiment of 3.5 to 4.50 sabines at 1,250 Hz, and in yet another embodiment of 3.65 to 4.25 sabines at 1,250 Hz. In at least one embodiment, sound absorption is measured by ASTM C423.

Figure 6:
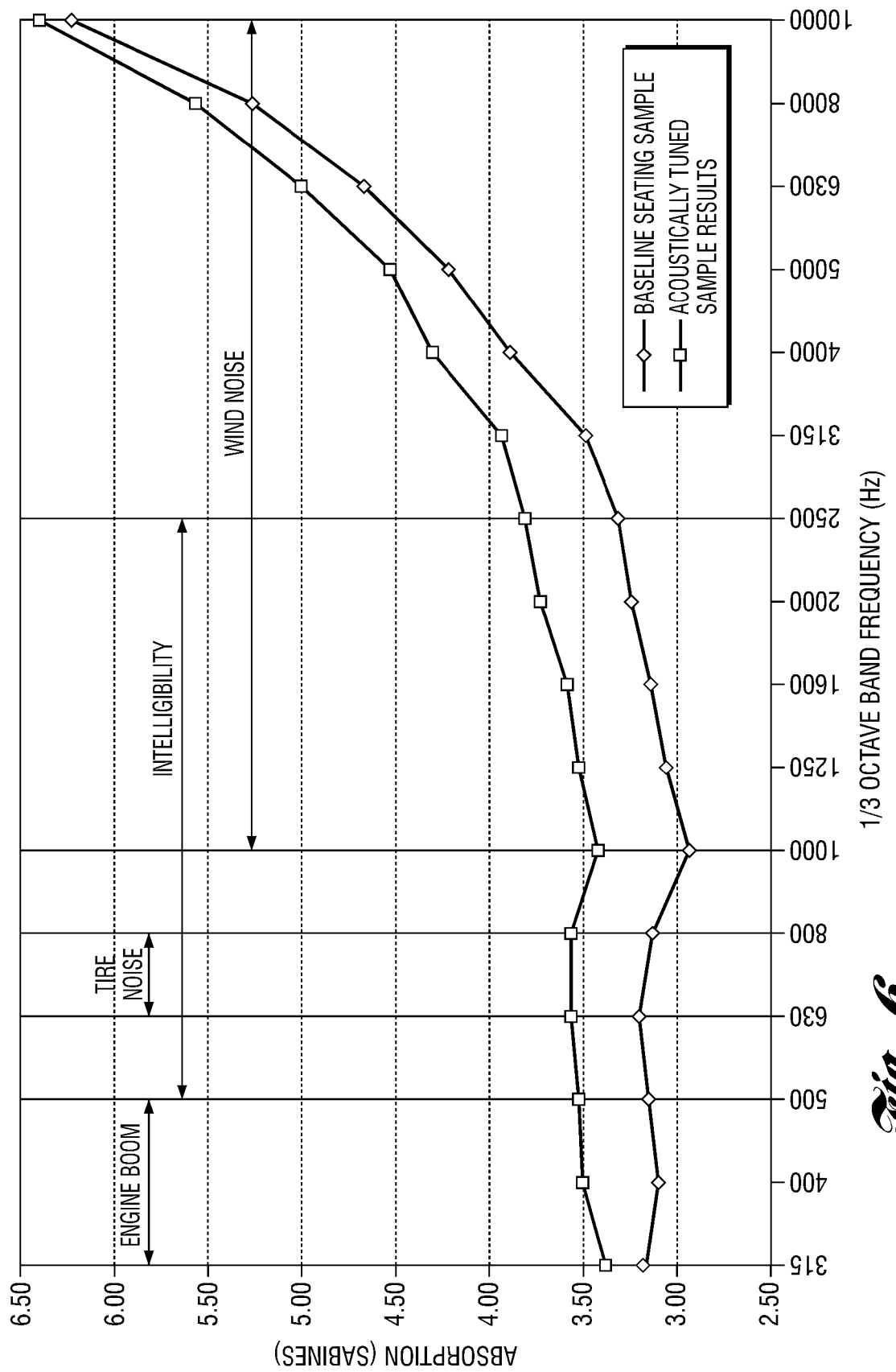
FIG. 6 is a graph depicting sound absorption of a seat sample made in accordance with an embodiment of the present invention relative to a certain baseline (non-acoustically tuned) seat sample.
Figure 7:
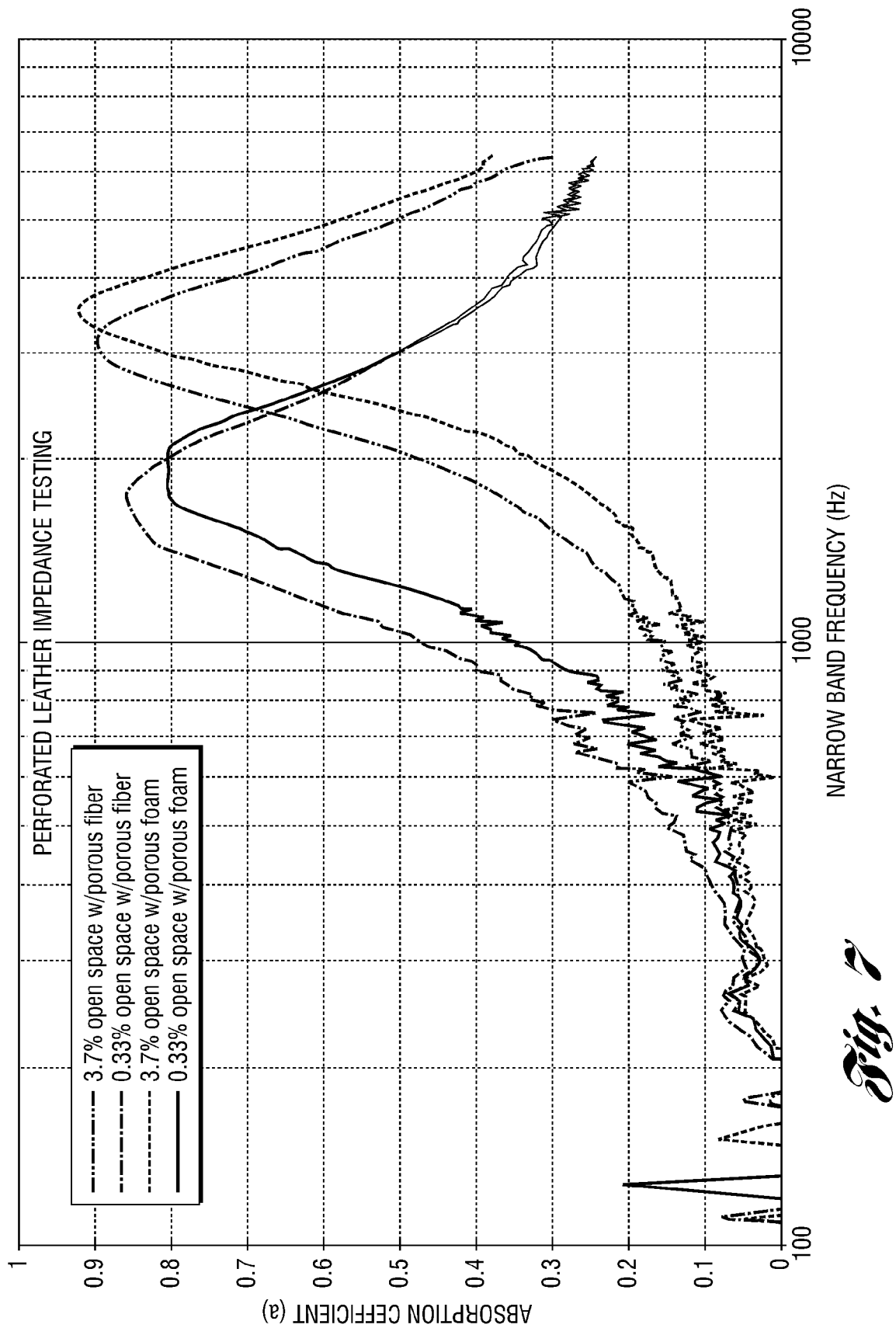
FIG. 7 is a graph depicting the ability to shift the maximum frequency region at which sound absorption of a vehicle occupant compartment is most consistent with vehicle occupant compartment absorption requirements, in accordance with certain embodiments of the present invention relative to a base line, non-acoustically-tuned cabin.

FIG. 6 depicts sound absorption of a seat sample made in accordance with an embodiment of the present invention relative to a baseline (non-acoustically tuned) seat sample. As can be seen, sound absorption of a seat made in accordance with at least one teaching or embodiment of the present invention provides for a greater sound absorption than non-slitted seats. In certain embodiments, an increase in sound absorption of 10 to 50 percent at 1,250 Hz, and in other embodiments of 15 to 25 percent at 1,250 Hz, can be appreciated by the practice of at least one teaching or embodiment of the present invention relative to non-slitted, conventional seats. As can be appreciated somewhat in FIG. 6, and further seen in FIG. 7, since the increase in sound absorption varies by frequency, seats of the present invention can be tuned by changing the backing material, as well as the foam material, characteristics, the opening size/geometry, and/or the percent open area. For example in an automotive vehicle, the vehicle is operated on a chassis dynamometer to determine the target noise frequency range to be absorbed during normal operation of the vehicle. For instance, engine noise can be simulated by operating the vehicle engine in first gear or at high speeds. Road noise can also be simulated by using rough or textured rollers. Road tests can also be run to measure factors such as wind noise and other vehicle noises. During these tests the interior cabin noise levels and frequencies can be measured. The seat assembly(s) can then be designed, based on the test data, to have certain trim opening size(s) and absorbing material type (s) or a combination of sizes and absorbing material types that best match the measured interior vehicle noise frequencies and levels. A complete interior seating system can be created for installation in a vehicle. The vehicle level tests can then be conducted again to verify that the targeted noise reduction absorption was achieved.

In at least one embodiment, the slits 40 are provided in such a manner that they are present in an amount between 100 to 25,000 slits per ft$^2$ of trim material 22, in another embodiment between 200 to 20,000 slits per ft$^2$ of trim material, in yet another embodiment between 1,000 to 7,500 slits per ft$^2$ of trim material, and in still yet another embodiment between 2,000 to 4,000 slits per ft$^2$. In at least one embodiment, the slits 40 are provided in such a manner that they provide a percent open area in an amount between 0.10 to 30%, based on the total area of the slitted region(s), in another embodiment between 2 to 25%, in yet another embodiment between 3 to 20%, and in still yet another embodiment between 5 to 15%.

As can be seen in the illustrated embodiments, the slitted area 30 is adjacent one or more non-slitted areas 34. While the non-slitted areas 34 may have absolutely no slits, it is understood that due to manufacturing design and various wear usages, that the non-slitted areas 34 may have some, all be it a much lesser number, of slits than the slitted region 30. For instance, non-slitted areas may have less than 10 slits/ft$^2$ of trim material.

The slits 40 may have any suitable shape desired. In one embodiment, the slits 40 are preferably slits having a length of 0.25 to 8 mm, in yet other embodiments of 0.75 to 4 mm, and in still yet other embodiments of 1 to 2.5 mm. While teardrops are the preferred shape of the slits 40, other suitable shapes such as channels, lines, angled-slits, diamonds, triangles, circles, ellipses, rectangles and squares could also be employed.

While the slits 40 could be provided in any suitable configuration or pattern, in at least one embodiment, the slits 40 are provided in straight rows, as shown in the Figures. In other embodiments, the slits 40 can be provided in a regular pattern of rows over the entire, or substantially, all of the trim material 22.

While the slits 40 may be made in any suitable manner, in at least one embodiment, the slits are made via laser scoring. Any suitable laser scoring machine can be used. In other embodiments, the slits 40 could be formed (i.e., scored) in the trim material 22 by cutting machines, such as by a roller or a die stamp with cutting blades.

After the slits 40 have been formed in the trim material, if not yet sewn together, the sections of the trim material can be sewn, or otherwise connected, to form a seat cover 22.

Figure 2:
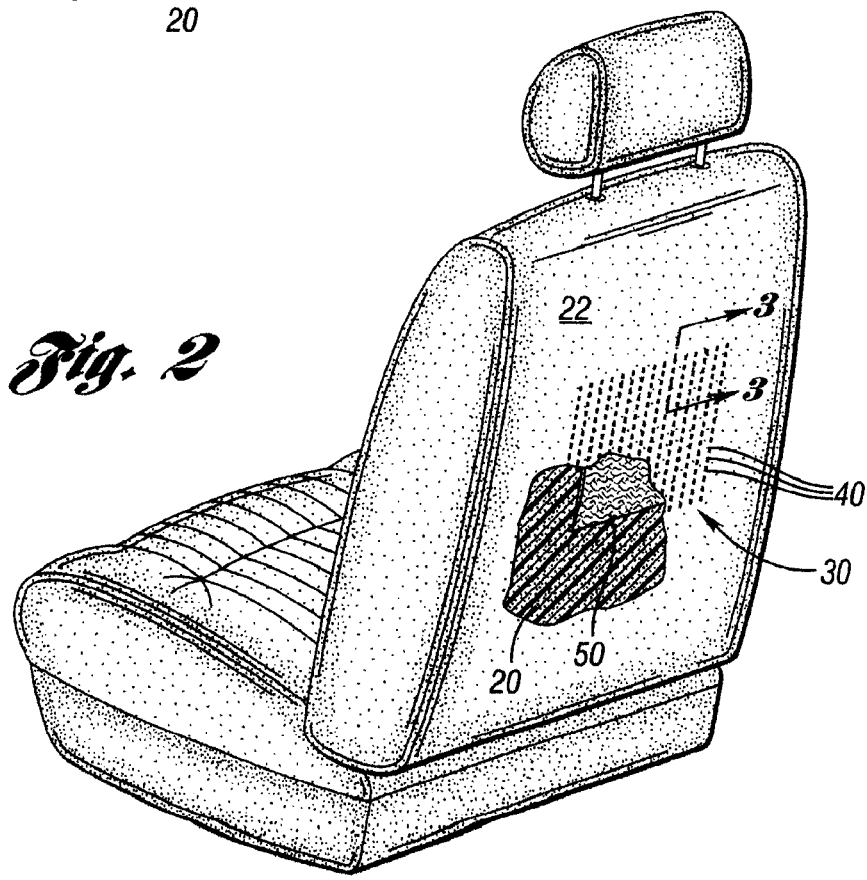
FIG. 2 is a schematic cut-away environmental view of a vehicle seat assembly in accordance with another embodiment of the present invention.

Referring to FIG. 2, an alternative embodiment is illustrated. In this embodiment, a sound attenuation layer, such as a layer of fibrous material 50 is provided. The layer of fibrous material 50 is disposed between the cushion 20 and the slitted region 30 of the trim material 22. The sound attenuation layer 50 has better sound absorption characteristics than the non-porous cushion 20.

The layer of porous fibrous material 50 is separate from the trim material 22 and can be placed between the cushion 20 and the trim material 22 in any suitable manner. In at least one embodiment, adhesive is disposed between the cushion 20 and the layer of fibrous material 50 to maintain the layer of fibrous material in the proper location. In other embodiments, attachment clips and/or Velcro can be used to maintain the sound attenuation layer 50 in place.

In at least one embodiment, the layer of fibrous material 50 comprises a sheet of relatively soft material, such as a pad of non-woven fibrous materials. While the layer of fibrous material 50 may have any suitable shape and size and configuration, in at least one embodiment, the layer of fibrous material 50 has an average thickness of 2 to 25 mm, in other embodiments of 5 to 20 mm, and in yet other embodiments of 8 to 15 mm.

In at least one embodiment, the layer of fibrous material 50 comprises a polyester, wood fiber and polyester blend, or nylon non-woven fiber pad. In at least one embodiment, the layer of fibrous material 50 comprises a non-woven compressed fiber material having a thickness of 2 to 25 mm and a wt. of 1 to 16 oz/ft$^2$.

In an alternative embodiment, the sound attenuation layer 50 can comprise a sheet of low hardness porous foam having an average thickness of 2 to 25 mm. In at least one embodiment, the sheet 34 has a density of 1.8 to 2.5 pcf, as measured according to ASTM test method No. D3574. In at least one embodiment, the foam sheet has a hardness of 5 to 12 N, as measured according to ASTM test method No. D3574 at a compression or deflection of 25%. In at least certain embodiments, the foam sheet can have an air permeability of above 2.0 ft$^3$/minute and/or a compression set (75%) of no more than 20%.

Referring to FIG. 4, various embodiment of the present invention are illustrated. As can be seen in FIG. 4, more than one slitted region 30 can be provided. While five slitted regions 30 are illustrated in FIG. 4, it should be understood that more or less slitted regions could be provided. Moreover, it should also be understood that the location of the slitted regions 30 could vary as desired. In at least one embodiment, the slitted region(s) 30 will be located in an area where sound absorption is most likely to be effective, i.e., in areas where sound is most likely to deflect within a passenger compartment. For instance, the slitted region(s) may be located on a seat assembly at locations that are not likely to be substantially covered by an occupant while seated on the seat assembly, such as the back and/or sides of the seat assembly.

Referring to FIG. 5, an alternative embodiment of the seat assembly 10 is illustrated. In this embodiment, the rear surface 34 of the trim material 22 has multiple regions 30 of slits. As with the other embodiments, the location and number of the slitted regions 30 can vary as desired.

In at least one particularly preferred embodiment, the regions of slits 30 will have a surface area of 10 to 54 ft$^2$, in at least another embodiment of 12 to 45 ft$^2$, and in yet another embodiment of 20 to 25 ft$^2$. In at least another embodiment, substantially all of the trim material 22 is covered with slits 40.

While embodiments to the invention has been illustrated and described, it is not intended that these embodiments illustrate and describe all possible forms of the invention. Moreover, the words used in the specification are words of description rather than limitation, and it is understood that various changes may be made without departing from the spirit and scope of the invention.

What is claimed is:

1. A vehicle seat assembly comprising:
    a frame;
    a cushion supported on the frame; and
    a non-cloth trim material secured over the cushion, the non-cloth trim material having at least one slitted region capable of providing a sound absorption for the seat assembly of at least 3.25 sabines at 1,250 Hz according to ASTM C423, the slitted region comprising a plurality of laser scored slits having an average width of less than 4.0 mm, an average length of 0.25 to 8 mm, and an open area of 0.10 to 30%.

2. The vehicle seat assembly of claim 1 wherein the trim material comprises at least one non-slitted region adjacent the slitted region wherein the non-slitted region is substantially free of slits.

3. The vehicle seat assembly of claim 2 wherein the non-slitted region has less than 10 slits per ft$^2$ of trim material.

4. The vehicle seat assembly of claim 3 wherein the slitted region has 100 to 25,000 slits per ft$^2$ of trim material.

5. The vehicle seat assembly of claim 3 wherein the vehicle seat assembly comprises a front seat disposed in a passenger compartment having a front and a rear passenger compartment, the trim material having a front surface facing the front passenger compartment and a rear surface facing the rear passenger compartment, the at least one slitted region being located on the rear surface of the trim material.

6. The vehicle seat assembly of claim 2 wherein the slitted region comprises an area of 10 to 54 ft$^2$.

7. The vehicle seat assembly of claim 2 further comprising a second slitted region, spaced from the first slitted region, with the non-slitted region extending between the slitted regions.

8. The vehicle seat assembly of claim 1 wherein the slitted region has 100 to 25,000 slits per ft$^2$ of trim material.

9. The vehicle seat assembly of claim 1 wherein the slits have an average width of 0.05 to 4 mm.

10. The vehicle seat assembly of claim 9 wherein all of the slits have a width of 0.05 to 4 mm.

11. The vehicle seat assembly of claim 1 wherein the slitted region is located in an area of the trim material not substantially covered by an occupant when seated in the seat assembly.

12. The vehicle seat assembly of claim 1 wherein the slits have a shape selected from the group consisting of channel-shaped, teardrop shaped, and diamond-shaped.

13. The vehicle seat assembly of claim 1 wherein the slits are arranged in a pattern of aligned rows and have an elliptical or circular shape.

14. The vehicle seat assembly of claim 1 wherein the cushion has a first sound absorption characteristic, the assembly further comprising a sound attenuation layer having a second sound absorption characteristic greater than the first sound absorbing characteristic, the sound attenuation layer being separate from the trim material and located between the cushion and the slitted region of the trim material.

15. The vehicle seat assembly of claim 14 wherein the sound attenuation layer comprises a non-woven polymeric fibrous pad having a thickness of 2 to 25 mm and a weight of 1 to 16 oz/ft$^2$.

16. The vehicle seat assembly of claim 1 wherein the slitted region comprises substantially all of the trim material.

17. A vehicle seat assembly comprising:
    a frame;
    a cushion supported on the frame, the cushion having a first sound absorption characteristic;
    a fibrous layer having a second sound absorption characteristic greater than the first sound absorbing characteristic, the fibrous layer comprising a non-woven polymeric fibrous pad having a thickness of 2 to 25 mm, a weight of 1 to 16 oz/ft$^2$; and
    a leather trim cover secured over the cushion, the leather trim cover comprising:
        at least one slitted region having a plurality of laser scored slits having an average width of less than 4.0 mm and an average length of 0.25 to 8.0 mm; and
        at least one non-slitted region adjacent the slitted region, with the non-slitted region being substantially free of slits;
    wherein the slitted region is located in an area of the trim material where noise is likely to deflect and the fibrous layer is separate from the trim material and is located between the cushion and the slitted region of the trim material.

18. A vehicle seat assembly comprising:
    a seat frame securable to a vehicle frame;
    a cushion supported directly on the seat frame; and
    a flexible non-cloth seat cover secured directly over the cushion, the non-cloth seat cover having at least one slitted region capable of providing a sound absorption for the seat assembly of at least 3.25 sabines at 1,250 Hz, the slitted region comprising a plurality of laser scored slits having an average width of less than 4.0 mm, an average length of 0.25 to 8 mm, and an open area of 0.10 to 30%.

19. The vehicle seat assembly of claim 18 wherein the vehicle seat assembly comprises a front seat disposed in a passenger compartment having a front and a rear passenger compartment, the seat cover having a front surface exposed to the front passenger compartment and a rear surface exposed to the rear passenger compartment, the at least one slitted region being located on the rear surface of the seat cover.

20. The vehicle seat assembly of claim 18 wherein the cushion has a first sound absorption characteristic, the assembly further comprising a sound attenuation layer having a second sound absorption characteristic greater than the first sound absorbing characteristic, the sound attenuation layer being separate from the seat cover and located between the cushion and the slitted region of the seat cover.

* * * * *